United States Patent [19]
Birsan et al.

[11] Patent Number: 6,023,578
[45] Date of Patent: Feb. 8, 2000

[54] SYSTEMS, METHODS AND COMPUTER PROGRAM PRODUCTS FOR GENERATING AN OBJECT ORIENTED APPLICATION FOR AN OBJECT ORIENTED ENVIRONMENT

[75] Inventors: Dorian Birsan; Christina Lau; Harm Sluiman, all of Ontario, Canada

[73] Assignee: International Business Macines Corporation, Armonk, N.Y.

[21] Appl. No.: 08/853,208

[22] Filed: May 9, 1997

[51] Int. Cl.[7] .................................................. G06F 9/44
[52] U.S. Cl. ............................................................ 395/702
[58] Field of Search .......................................... 395/702

[56] References Cited

U.S. PATENT DOCUMENTS

| | | | |
|---|---|---|---|
| 5,481,718 | 1/1996 | Ryu et al. | 395/701 |
| 5,499,371 | 3/1996 | Henninger et al. | 395/700 |
| 5,524,246 | 6/1996 | Hurley et al. | 395/700 |
| 5,560,012 | 9/1996 | Ryu et al. | 395/701 |
| 5,644,764 | 7/1997 | Johnston et al. | 395/614 |
| 5,706,505 | 1/1998 | Fraley et al. | 395/614 |
| 5,721,925 | 2/1998 | Cheng et al. | 395/683 |
| 5,758,160 | 5/1998 | McInerney et al. | 395/701 |
| 5,768,510 | 6/1998 | Gish | 395/200.33 |
| 5,848,273 | 12/1998 | Fontana et al | 395/701 |
| 5,872,973 | 2/1999 | Mitchell et al. | 395/702 |

OTHER PUBLICATIONS http://www.objectquest.com/modules.htm#Ulbuilder; *ObjectQuest™*, pp. 1–10.
http://www.persistance.com/persistence/pageThree.pages/pr.patent.html; *Persistence Software Awarded Technology Patent*, pp. 1–2.
http://www.persistance.com/persistence/pageTwo.pages/otoroview.html; *Delivering The Benefits of Objects in a Relational World*, pp. 1–11.
http://www.janiff.com/docs/busfun.htm; *APOL 'Business' Functionality*, pp. 1–3.
http://www.omg.org, *What is CORBA????*, pp. 1–2.
http://www.rational.com; total pages: 52.
Balen, Henry, *CORBA and the WWW*, OOPLSLA ACM SIGPLAN, Conf. OO Prog. Syst. Lang & Appl., pp. 128–132.
Sutherlan, Jeff *Business Object Design and Implementation III*, OOPSLA ACMSIGPLAN, Conf. OO Prog. Syst. Lang & Appl., pp. 58–62.
Hansen, Todd, *Development of Successful Object Oriented Framework*, OOPSL ACM SIGPLAN, Conf. Prog. Syst. Lang. & Appl., pp. 115–119.
http://www.chernigov.ua/~softfab/sf_ua3.html; *Background to OpenDoc*, pp. 1–6.
Abstract, *The benefits of building object–oriented applications,* Softw. Econ. Lett., vol. 5, No. 8, Computer Economics, (abstract only) –(NEP) (May–Jun. 1996).

(List continued on next page.)

*Primary Examiner*—Emanuel Todd Voeltz
*Assistant Examiner*—John Q. Chavis
*Attorney, Agent, or Firm*—Myers Bigel Sibley & Sajovec; Edward H. Duffield

[57] ABSTRACT

Methods, systems and computer program products generate a computer program design for an object oriented application using a modeling tool. The computer program design is mapped to a data model in an object oriented environment. The computer program design is mapped to the data model using a mapping convention that includes name space mapping, class specification and programming model mapping. Using the mapping convention, a generated computer program design may be mapped to the data model without reference to any specialization from the programming model, with default specializations from the programming model, or with developer customizations of specializations from the programming model.

45 Claims, 3 Drawing Sheets

OTHER PUBLICATIONS

Abstract, Castellano, G.V., et al., *System Object Model (SOM) and Ada: an example of CORBA at work*, Ada Lett., vol. 16, No. 3, ACM, (abstract only) –(NEP) (May–Jun. 1996).

Abstract, Blakeley, J.A., *Open object database management systems*, 1994 ACM SIGMOD International Conference on Management of Data, Minneapolis, Minnesota, vol. 23, No. 2, (abstract only) (NEP) (Jun. 1994).

Abstract, Short, K., *Developing with business object*, Object Mag., vol. 5, No. 1, abstract only –(NEP) (Mar.–Apr. 1995).

Abstract, Adamczyk, Jr., et al., *Trading off: inheritance vs. reuse*, Object Mag., vol. 5, No. 5, (Abstract only) –(NEP) (Sep. 1995).

Abstract, *How Xerox is coupling object–oriented analysis with business process reengineering*, I/S Anal., vol. 34, No. 8, (abstract only) –(NEP) (Aug. 1995).

Abstract, *Object oriented business engineering: delivering the Distributed Enterprise, IN Object Expo. Conference Proceedings*, Proceeding of OBJECT EXPO '94, (Abstract only) (NEP) (Jun. 6–10, 1994).

SYSTEMS, METHODS AND COMPUTER PROGRAM PRODUCTS FOR GENERATING AN OBJECT ORIENTED APPLICATION FOR AN OBJECT ORIENTED ENVIRONMENT

This invention relates to data processing systems, methods and computer program products, and more particularly, to object oriented development systems, methods and computer program products.

BACKGROUND OF THE INVENTION

Overview: Object Oriented Technology

Object oriented programming systems and processes, also referred to as "object oriented computing environments," have been the subject of much investigation and interest in state of the art data processing environments. The present invention was developed using object oriented technology.

Object Oriented Technology v. Procedural Technology

Although the present invention relates to a particular object oriented technology (i.e., object oriented framework technology), the reader must first understand that, in general, object oriented technology is significantly different than conventional, process-based technology (often called "procedural" technology). While both technologies can be used to solve the same problem, the ultimate solutions to the problem may be quite different. This difference is due to the fact that the design focus of procedural technology is entirely different from that of object oriented technology. The focus of process-based design is on the overall process that solves the problem; whereas, the focus of object oriented design is on how the problem can be broken down into a set of autonomous entities that can work together to provide a solution.

Object Oriented Technology Terminology

The autonomous entities of object oriented technology are called objects. Said another way, object oriented technology is significantly different from procedural technology because problems are broken down into sets of cooperating objects instead of into hierarchies of nested computer programs or procedures. An object is a data structure, also referred to as a "frame," and a set of operations or functions, also referred as "methods," that can access that data structure. Each object also has an "interface" associated with it. An interface defines the way in which methods operate on their associated object. The frame has many "slots" each of which contains an "attribute" of the data in the slot. The attribute may be a primitive such as an integer or a string or an object reference which is a pointer to another object. Objects having similar characteristics and common behavior can be grouped together into, and collectively identified as, a "class."

Each defined object will usually be manifested in a number of "instances." Each instance contains the particular data structure for a particular example of the object. In an object oriented computing environment, the data is processed by requesting an object to perform one of its methods by sending the object a "message." The receiving object responds to the message by choosing the method that implements the message name, executing this method on the named instance and returning control to the calling high-level routine along with the results of the method. The relationships between classes, objects and instances are established during "build time" or generation of the object oriented computing environment, i.e., prior to "run time" or execution of the object oriented computing environment.

In addition to the relationships between classes, objects and instances identified above, hierarchical relationships also exist between two or more classes such that a first class may be considered a "parent" of a second class and the second class may be considered a "child" of the first class. In other words, the first class is an ancestor of the second class and the second class is a descendant of the first class, such that the second class (i.e, the descendant) is said to inherent from the first class (i.e., the ancestor).

Frameworks

The word "framework" has multiple meanings in object oriented technology. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an object oriented mechanism that has been designed to have core function and extensible function. The core function is the part of the framework mechanism that is not subject to modification by the framework user. The extensible function, on the other hand, is that part of the framework mechanism that has been explicitly designed to be customized and extended by the framework user.

A framework may be generally defined as a set of cooperating classes that make up a reusable design for a specific class of software. A framework may be directed to, for example, building graphical editors for different domains such as artistic drawings, music compositions, mechanical computer aided designs, a compiler for a programming language, target machines or a financial modeling application. A framework is customized to a particular application by creating application specific subclasses of abstract classes from the framework. The framework defines the overall structure, its partitioning into classes and objects, the key responsibilities of the classes and objects, the relationships between the classes and objects, and the control of the application. The framework also captures the design decisions that are common to its application domain.

In essence, a framework is comprised of a set of related classes that are designed to interact to solve a particular problem. The framework provides the specific connections and relationships between the relating classes and internally manages the flow of control.

Object Oriented Framework Mechanisms

While in general terms an object oriented framework mechanism can be properly characterized as an object oriented solution, there is nevertheless a fundamental difference between a framework mechanism and a basic object oriented solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to users (referred to herein as framework consumers) because the cost of customizing or extending a framework is much less than the cost of replacing or reworking an existing solution.

Therefore, when framework designers set out to solve a particular problem, they do more than merely design individual objects and how those object interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF —An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the "problem domain." The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an object oriented framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

Object Oriented Computing Environment

Referring now to FIG. 1, a schematic block diagram of an object oriented computing environment 10 is illustrated. The object oriented computing environment 10 includes a processor 11 which may be a mainframe computer, minicomputer, personal computer, or other hardware platform. As is well-known to those having skill in the art, processor 11 includes a volatile data storage device 13, typically random access memory (RAM), for providing a working storage for active data and intermediate results. Data in RAM 13 is erased when power to the data processor 11 is removed or a new user session is begun.

Object oriented computing environment 10 also includes a non-volatile data storage device 14 for permanent storage of objects. Device 14 may be a direct access storage device (DASD), a disk file, a tape file, or erasable optical disk or other well-known device. A display terminal 15 including a cathode ray tube (CRT) or other display, a keyboard and a mouse, is also shown.

An object oriented program 12 runs or executes in processor 11. Object oriented operating program 12 may be programmed in object oriented languages such as "C++" or "SmallTalk" or variations thereof, or in conventional programming languages such as FORTRAN or COBOL. The design of an object oriented operating program 12 is well-known to those skilled in the art of object oriented computing environments, and will not be described herein. A detailed description of the design and operation of an object oriented program is provided in "Object Oriented Software Construction," by Bertrand Meyer, published by Prentice Hall in 1988, the disclosure of which is incorporated herein by reference.

Visual Modeling Tools

When developing application programs, developers often use visual modeling tools in an analysis environment to first perform the design analysis and then to develop the business architecture and design. The purpose of conducting the design analysis is to identify and define the application requirements and functionality for the application program. For example, if the application program being developed is a business application for use in the insurance industry, a requirement may be that the application program must query information relating to customers in an insurance environment, and the functions may include tracking customers and resolving customer claims.

The next step in the development process is to develop the architecture and design for the application program based upon the requirements and functionality developed during the analysis. The architecture and design breaks the requirements and functionality down into modules or basic elements. The developer starts with a high level design and refines the design into lower levels to include more detail. The designer will design objects and classes in an attempt to match real world objects to objects in the application program to be developed for use in an object oriented environment, and to introduce new classes that may not be part of the real world objects. For example, the developer first designs objects in classes at a high level and identifies relationships between the objects and classes. The developer then expands the initial architecture and design to a more detailed architecture and design. In the insurance example previously described, the designer may identify the classes such as "Customer," "Agent," "Policy" and "Claim."

The developer may also introduce new classes, and may add attributes and methods to the design. Finally, the designer may identify relationships between the classes, including a relationship between "Agent" and "Customer," and a relationship between "Claim" and "Policy." As part of defining relationships between classes, the designer may also introduce inheritance into the relationships. The introduction of inheritance into the relationships enables the identification of commonality between classes.

A number of different visual modeling tools which assist a designer in performing the analysis and developing the architecture and design exist. One particular modeling tool is referred to as the Rational Rose visual modeling tool. Various versions of the Rational Rose modeling tool exist to provide support for the creation of relational database logical models and to enable seamless integration with heterogeneous development environments. The Rational Rose visual modeling tool is marketed by the Rational Software Corporation. The Rational Rose visual modeling tools are well known to those skilled in the art of object oriented computing environments, and will not be described herein. A detailed description of the Rational Rose visual modeling tools marketed by the Rational Software Corporation is provided at Rational Software Corporation's website located at "http://www.rational.com," the disclosure of which is incorporated herein by reference.

Integration of Development Tools and Implementation

As the size and complexity of application programs continue to grow, the reliance upon visual modeling tools increases significantly. Large enterprises typically use visual modeling tools, such as the Rational Rose visual modeling tool, to perform the analysis and to develop the architecture and design. Once the analysis, which may be referred to as the "front end analysis," is completed, the resulting problem that has been defined by the front end analysis must be broken down into logical pieces and given to developers to complete the design by developing the lower level design and performing the implementation.

This transformation or conversion from the high level architecture and design to the low level design and implementation is typically a manual process which requires the developers to take the classes, objects, relationships, inheritances, methods and attributes developed using the visual modeling tools during front end analysis, and complete the architecture and the design by converting these features or components manually into classes, objects, relationships, inheritances, methods and attributes into an interface definition language such as IDL in the object oriented environment. Thereafter, the completed design, which may be referred to as "metadata," may be stored in the data model. Thereafter, code can be generated from the data model.

This manual process may result in numerous errors. In addition, as a result of the tedious nature of this manual process and due to the ever increasing size and complexity of program applications, this manual process may be very time consuming and expensive.

SUMMARY OF THE INVENTION

The present invention converts or transforms a computer program design to a low level design (or metadata) and implementation, or object oriented application, by mapping the computer program design created in the analysis environment to a data model for the object oriented application. According to the present invention, a computer program design is generated for an object oriented application using a modeling tool. The computer program design generated using the modeling tool is mapped to the data model in the object oriented environment to create metadata in the data model.

The invention is described with respect to a specific modeling tool, a specific type of design, and a specific object oriented programming environment. The specific modeling tool is the Rational Rose visual modeling tools. The specific type of design is a business logic design or business object model. The specific object oriented programming environment is the Business Object Server Solution (BOSS) application development environment (also referred to as the CB Series application development environment) which is the subject of the co-pending application entitled "Reusing Code in Object Oriented Program Development" filed on May 1, 1997 and assigned U.S. patent application Ser. No. 08/846,869 (hereinafter "the Reusing Code patent application"), and the co-pending application entitled "Systems, Methods and Computer Program Products for Building Frameworks in an Object Oriented Environment" filed concurrently herewith and assigned U.S. patent application Ser. No. 08/853,207 (hereinafter "the Building Frameworks patent application"), both of which are assigned to International Business Machines Corporation ("IBM"), the assignee of the present invention. The Reusing Code patent application lists Christina Lau as the inventor and has an internal IBM docket number of CA9-97-011. The Building Frameworks application lists Christina Lau as the inventor and has an internal IBM docket number of CA9-97-016. The disclosures of the Reusing Code patent application and the Building Frameworks patent application are incorporated herein by reference. Notwithstanding the above, the invention is not restricted to any particular modeling tool, any particular type of design, or any particular object oriented programming environment. Rather, the invention may be applicable to any modeling tool, any type of design, and any object oriented programming environment.

In particular, a package is defined in the analysis environment. It is a group structure which is used to group classes and has no model semantics. A package may be empty, may comprise one or more classes, or packages (i.e., subpackages) which in turn comprise one or more classes. Packages partition the computer program design into at least two parts (i.e., classes within the package and classes outside the package). The package is mapped to at least one of a file and a module in the data model. A class in the package is mapped to an interface in the data model in the object oriented environment. In addition, the package may comprise a second package which is contained in the first package. The second package comprises at least one class, and partitions the design into at least two parts without requiring a reference to model semantics. Thereafter, at least one class in the second package is mapped to an interface in the data model of the object oriented environment.

A class specification in the analysis environment may also be identified. The class specification comprises at least one class, relationships between the one class and a second class, an inheritance associated with the one class, at least one attribute associated with the one class, and at least one method associated with the one class. The class specification is identified by class name. Thereafter, the class specification from the analysis environment is mapped to an interface in the data model in the object oriented environment.

Still further, an export control of either "public" or "private" may be assigned to each class specification. Thereafter, the class name in the analysis environment is mapped to an interface name in the object oriented environment. In addition, if the export control associated with the class specification is "public," the attribute in the analysis environment is mapped to an attribute in the data model in the object oriented environment. On the other hand, if the export control associated with the class specification is "private," the attribute and the operation in the analysis environment are mapped to the private data of an interface in the data model in the object oriented environment.

In addition, frameworks from a programming model in the object oriented environment may be imported into the data model in the object oriented environment. If a framework which is a default framework, which may also be referred to as a "core" framework, is selected for loading or importing into the data model, it is imported directly into the data model at the same time the design from the analysis environment is conceptually mapped to the data model. However, if the framework from the programming model of the object oriented environment is to be modified by the developer, i.e., if the framework is an "extensible" framework, the framework from the programming model in the object oriented environment is imported into the design into the analysis environment.

Once an element from the programming model has been loaded into the modeling tool, relationships between the element (e.g., framework) from the programming model and a business class that was defined in the design are determined, and the determined relationships are added to the design in the analysis environment. Thereafter, the determined relationship and the business class are then imported to the data model in the object oriented environment by conceptually mapping the determined relationship and the business class from the analysis environment to the data model in the object oriented environment. As a result, frameworks from the programming model may be populated into the modeling tool, relationships between the frameworks from the programming model and business classes in the analysis environment are determined as well as additional business classes may be added, and the added business classes and the relationships between the frameworks from the programming model and the business classes are then, in turn, imported to the data model without reimporting the frameworks from the programming model.

Once the design has been completed, frameworks from the programming model have been imported into the analysis environment and processed, and the modified design resulting from the analysis has been imported to the data model in the object oriented environment, code is then generated based on the data model.

More particularly, the methods, systems and computer program products according to the present invention enable conversion of a design created in the analysis environment using a modeling tool, to a data model, which may be defined using an IDL, without reference to any particular programming model, such as, for example, the BOSS programming model. More particularly, the present invention enables conversion of business classes, relationships between business classes defined in the analysis environment and frameworks that were originally defined in the programming model, and other elements of the design created using the modeling tool to an interface in the data model without importing the frameworks which were originally from the programming model. As such, the developer is not required to have an understanding of the object oriented environment.

Thus, the present invention includes a mapping convention based on name space, class specification and development environment behavior to convert a design from the analysis environment to a data model in the object oriented environment.

DESCRIPTION OF THE PREFERRED EMBODIMENTS

The present invention will now be described more fully hereinafter with reference to the accompanying drawings, in which a preferred embodiment of the present invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Overview

The system for converting a design created using a modeling tool to an object oriented application serves to bridge the design to the data model. The system enables the conversion or transformation from the high level architecture of the design to the low level design and implementation by converting the classes, objects, relationships, inheritances, methods and attributes and other elements of the design into interfaces, objects, relationships, inheritances, methods and attributes and other elements in the data model which is represented by an interface definition language.

Figure 1:
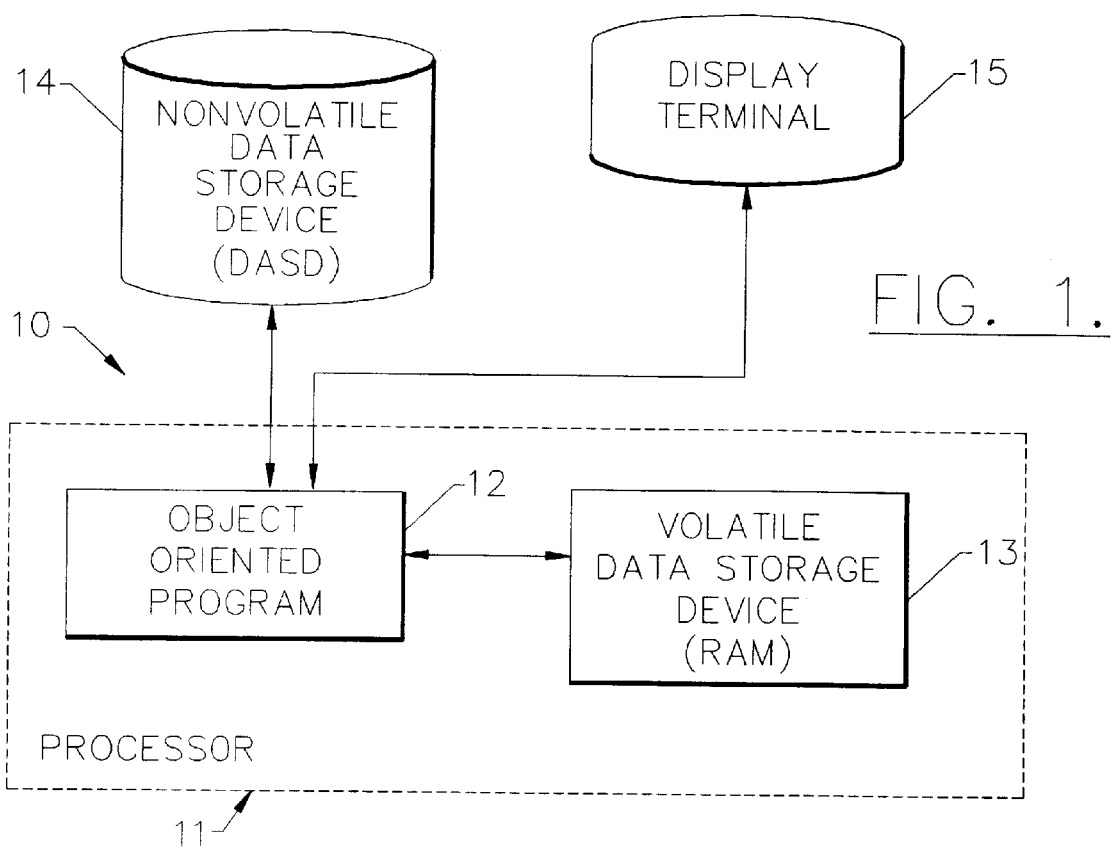
FIG. 1 illustrates a block diagram of an object oriented computing environment.
Figure 2:
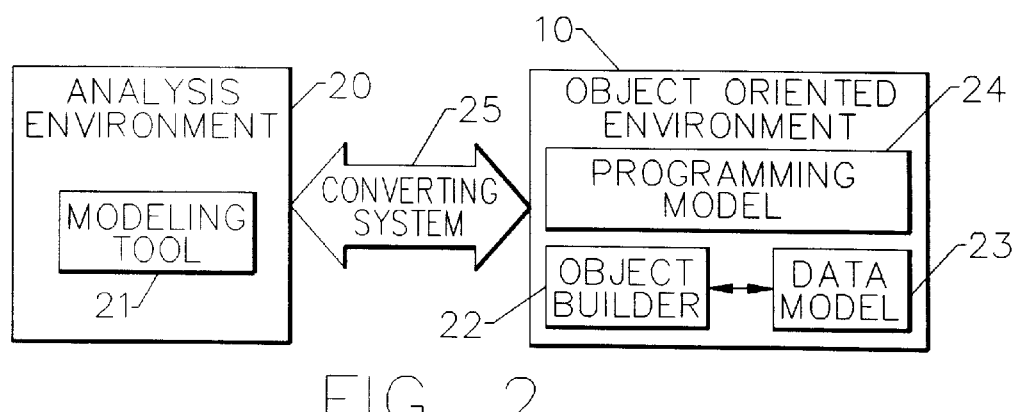
FIG. 2 generally illustrates the analysis environment and the object oriented development environment.

Referring now to FIG. 2, a block diagram of the analysis environment, converting system and object oriented environment is illustrated. The analysis environment 20 includes modeling tool 21. Preferably, modeling tool 21 is the Rational Rose visual modeling tool. The object oriented environment 10 which was described with respect to FIG. 1, and includes processor 11, also includes Object Builder 22 and data model 23. Object Builder 22 is described in detail in the Building Frameworks patent application, which is incorporated herein by reference. The object oriented environment also includes programming model 24. Programming model 24 provides a description or library of frameworks and other elements and artifacts which may be referred to as "programming model elements" or "elements." Data model 23, on the other hand, represents the low level design and includes data. The contents of the data model may be referred to as "metadata." An example of a programming model is the BOSS programming model which is the subject of the Building Frameworks patent application, which is incorporated herein by reference. The data model and metadata are disclosed in the Reusing Code patent application which also is incorporated herein by reference. Finally, the converting system 25 converts or transforms the design created using modeling tool 21 into data model 23.

The programming model provides frameworks, which may be referred to as services, that are "core" frameworks that provide basic services such as transactions and life cycle which cannot be modified by the developer. In addition, the programming model also provides "extensible" frameworks such as, for example, managed object framework, which may be modified by the user.

Figure 3A:
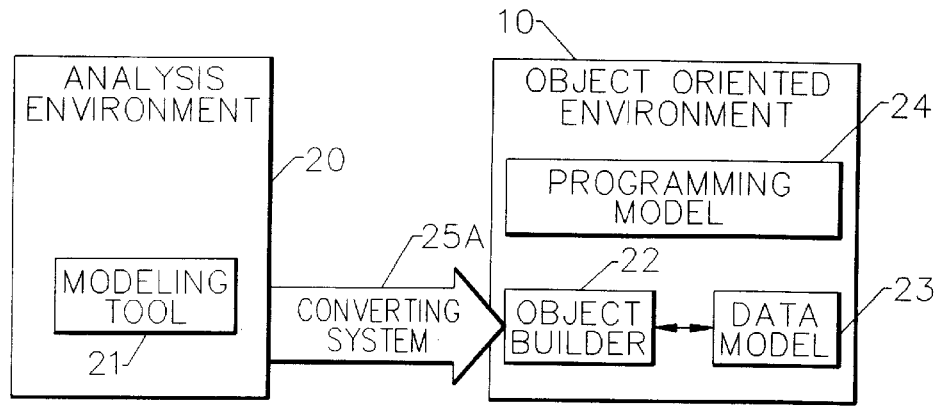
FIGS. 3A–3C are block diagrams illustrating the analysis environment and the object oriented development environment for bridging the design from the analysis environment to the data model without inclusion of object oriented programming model specialization (i.e., without framework), with default object oriented programming model specialization (e.g., core frameworks) and with user defined object oriented programming model specialization, respectively (e.g., extensible frameworks).
Figure 3B:
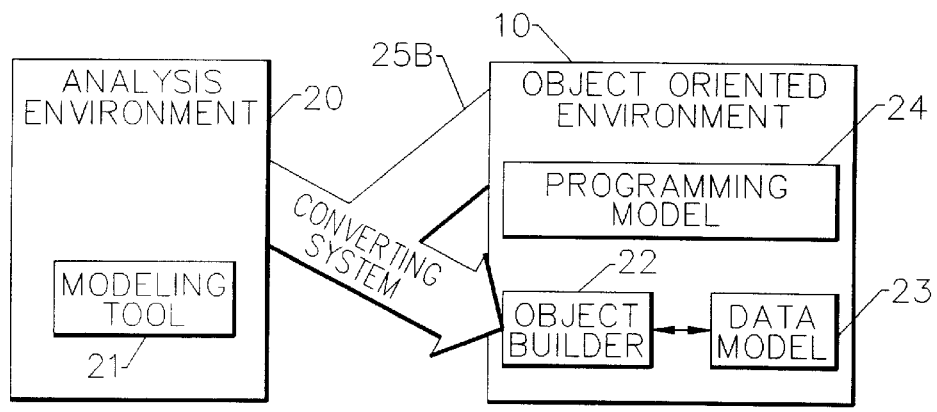
Figure 3C:
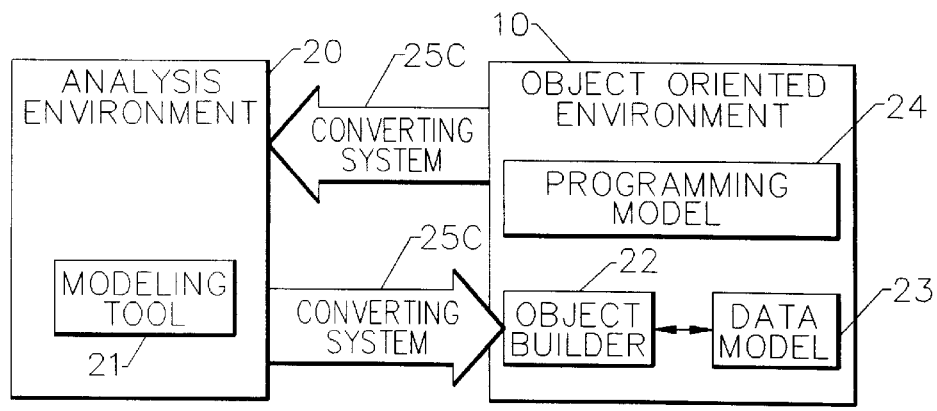

The converting system according to the present invention may convert the design to the data model without including any frameworks from the programming model, as illustrated in FIG. 3A. In addition, the converting system also enables the inclusion of default frameworks from the programming model to be included with the design as it is converted into the data model, as illustrated in FIG. 3B. Finally, frameworks from the programming model may be imported into the modeling tool, and thus the design, in which case relationships between the business classes in the design and the frameworks from the programming model will be determined, and the design including the relationships between the business classes, and between the business classes and the frameworks from the programming model, are imported back to the object oriented environment and into the Object Builder for inclusion in the data model, as illustrated in FIG. 3C. The frameworks which were imported from the programming model to the modeling tool are not exported to the Object Builder (i.e., are not imported to the Object Builder from the modeling tool).

The converting system conceptually maps the design to the data model using a mapping convention which includes "name space" mapping, "class specification" mapping and "programming model behavior" mapping. In name space mapping, the converting system maps packages defined by the modeling tool to an IDL file or module in the data model. A "packager" represents a logical grouping of classes, and may contain classes, or other packages, but does not contain any semantics.

Class specification mapping provides mapping of the object model in the design. The object model includes classes, the relationships and inheritances of the classes, and the internal structure of the classes. A class specification is mapped from the design to the data model as an interface.

The mapping convention for the converting system according to the present invention also enables the loading of programming model elements such as frameworks from the programming model into the modeling tool to enable a developer to extend the design to include elements from the programming model in the design. The extended design which includes programming model elements such as core frameworks, extensible frameworks, or both core and extensible frameworks, is then mapped to the data model.

Finally, the converting system also enables incremental conceptual mapping from the design to the data model. Once the original design has been mapped to the data model, the developer can add additional classes, operations, attributes and other elements to the existing design, and convert the new portions of the design to the data model.

Detailed Description: Converting System

As previously indicated, the converting system converts a design which contains no elements from the programming model to a data model, converts a design which contains default elements such as core frameworks from the programming model to the data model, and converts a design which contains user defined programming model elements such as extensible frameworks to the data model. In converting the design to a data model when no elements from the programming model are included, the classes defined in the design are mapped to an interface in the data model. Elements from the programming model may be added to the data model thereafter either using the incremental capabilities which will be discussed below for using the object builder. This embodiment of the present invention is illustrated in FIG. 3A, and in particular, the converting system 25a for this embodiment is illustrated.

As previously indicated, the converting system may also convert a design to a data model while providing default programming model elements also to the data model as illustrated in FIG. 3B. The converting system 25b of FIG. 3B maps the design from the analysis environment 20 to the data model 23 and includes default programming model elements. The default elements are displayed to the developer on display terminal 15 (see FIG. 1). The developer's selection of various default programming model elements such as a core framework is accepted by the converting system and transmitted to the data model along with the design which is being mapped to the data model.

The default elements options from the programming model include integration of the business classes from the design into the framework hierarchy from the programming model, a default implementation interface from the programming model for a business class in the design, a default data object interface from the programming model for a business class in the design, a default key interface from the programming model for a business class in the design, and a default copy helper interface from the programming model for a business class in the design. The inclusion of default elements from the programming model, which in the present invention is preferably the BOSS programming model which is disclosed in the Reusing Code patent application and the Building Frameworks patent application, enables a design to work in the programming model environment, without requiring the developer to understand the programming model during the initial design phase. It will be understood that default programming model elements other than those identified above may be available.

The integration of the business classes from the design into the programming model framework hierarchy will now be described. By default, if the developer does not desire to include any elements from the programming model in the design, the converting system creates, or updates, interfaces such as "structs" or "enums" and all the relationships between the various classes, including those with the framework interfaces. The interfaces such as "structs" and "enums" are described in the Reusing Code patent application.

A business class from the design, or a client interface in the data model which corresponds to a business class, should have an implementation interface under the programming model. For example, a business class of "Policy" should have an implementation interface of "PolicyBO." If the developer selects the default implementation interface from the elements of the programming model, the converting system creates an implementation interface corresponding to the business class and adds the necessary attributes and methods to the interface which correspond to the attributes and operations associated with the business class in the design.

With respect to data object interfaces, an implementation interface corresponding to a business class should have a data object interface if the business class is persistent. For example, if the business class "Policy" is persistent, then its implementation interface "PolicyBO" should have a data object "PolicyDO." If the developer selects the default data option interface elements from the programming model, the converting system creates the data object interface and stores all the attributes of the implementation interface "PolicyBO" into the data object interface "PolicyDO."

If the developer selects an element for a default key interface from the programming model, the converting system creates a "Key" class for a client interface. This Key class can be customized thereafter using the Object Builder.

Finally, if the developer selects an element for a default copy helper interface from the programming model for a business class in the design, the converting system creates a "CopyHelper" class for the client interface. This CopyHelper interface thereafter can be customized using the Object Builder.

As illustrated in FIG. 3C, the converting system according to the present invention also enables the developer to include user defined or modified elements from the programming model in the design, and to convert the new design into the data model, as illustrated in FIG. 3C. Converting system 25c loads the elements from programming model 24 into modeling tool 21. The developer can then "subclass" directly from the frameworks and other elements imported from the programming model into the modeling tool and indicate how the business classes in the design will use the imported frameworks. Thereafter, the converting system 25c then maps the modified design incorporating the relationships between the imported frameworks and the business classes in the original design to the data model. The frameworks imported from the programming model to the modeling tool themselves are not imported from the modeling tool to the data model.

Detailed Description: Mapping Conventions

The converting system uses a set of mapping conventions for bridging the design created using the modeling tool to the data model for all three situations described above including conversion without including any programming model specialization, conversion including default programming model specialization, and conversion including user defined programming model specialization. When the design in any of these three situations is mapped into the data model, it is actually mapped to the interface definition since the data model is represented in an interface definition language. The mapping convention provides for mapping of name space, mapping of the class specification, and mapping of programming model behavior.

Mapping of the name space will now be described in detail. As previously described, the Rational Rose visual modeling tool provides a logical grouping of classes into packages. A package is a grouping structure which has no model semantics. It may be empty, or contain either classes or other packages. In essence, packages partition the logical view known as the Rose Logical View. The converting system maps the notion of packages to an IDL file or to a module.

Figure 4:
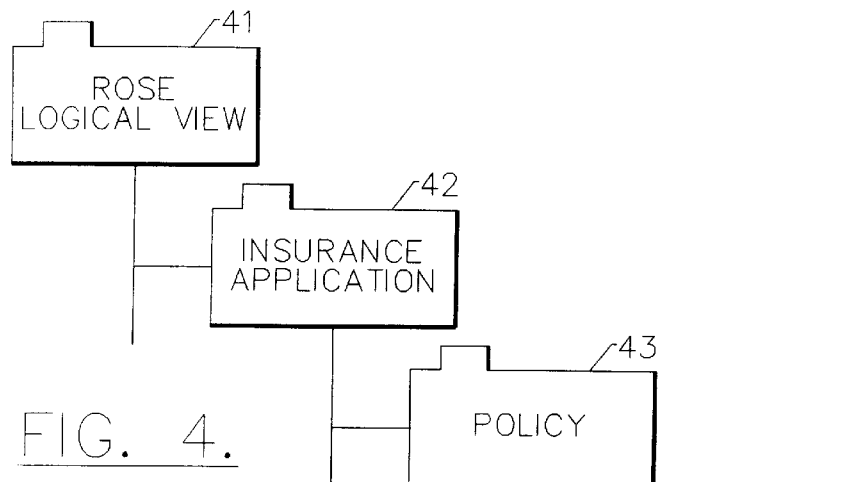
FIG. 4 is a block diagram illustrating an example of name space mapping, and in particular, mapping of two subpackages in the design from the analysis environment to an IDL file in the data model according to the present invention.

The name space mapping may be best understood with respect to the following examples. Referring to FIG. 4, an example of the grouping of business classes in the design is illustrated. In this example, Rose Logical View 41 is a package and also the parent for the example. At the next level, "Insurance Application" 42 is also a package that has Rose Logical View as parent. In addition, "Policy" 43 and People 46 are also packages which are actually subpackages of "Insurance Application" package 42. Finally, "Policy" 44 and "PayoutFraction" 45 are classes within "Policy" package 43. Similarly, "Customer" 47 and "Agent" 48 are classes within "People" package 46. It will be understood by those skilled in the art that the classes such as, for example, "Policy" class 44 may have attributes and methods associated therewith.

In the example illustrated in FIG. 4, "Policy" package 43 and "People" package 46 may be referred to as "subpackages" and are contained by the "Insurance Application" package 42. The converting system maps each of the two subpackages "Policy" 43 and "People" 46 to a corresponding IDL file containing a module in the data model. As a result, the converting system also conceptually maps the "Policy" class 44 and "PayoutFraction" class 45 to "Policy" and "PayoutFraction" interfaces in the "Policy" module of the Policy file in the data model. Similarly, the converting system maps the "Customer" class 47 and "Agent" class 48 to "Customer" and "Agent" interfaces in the "People" module contained in the "People" file in the data model.

Figure 5:
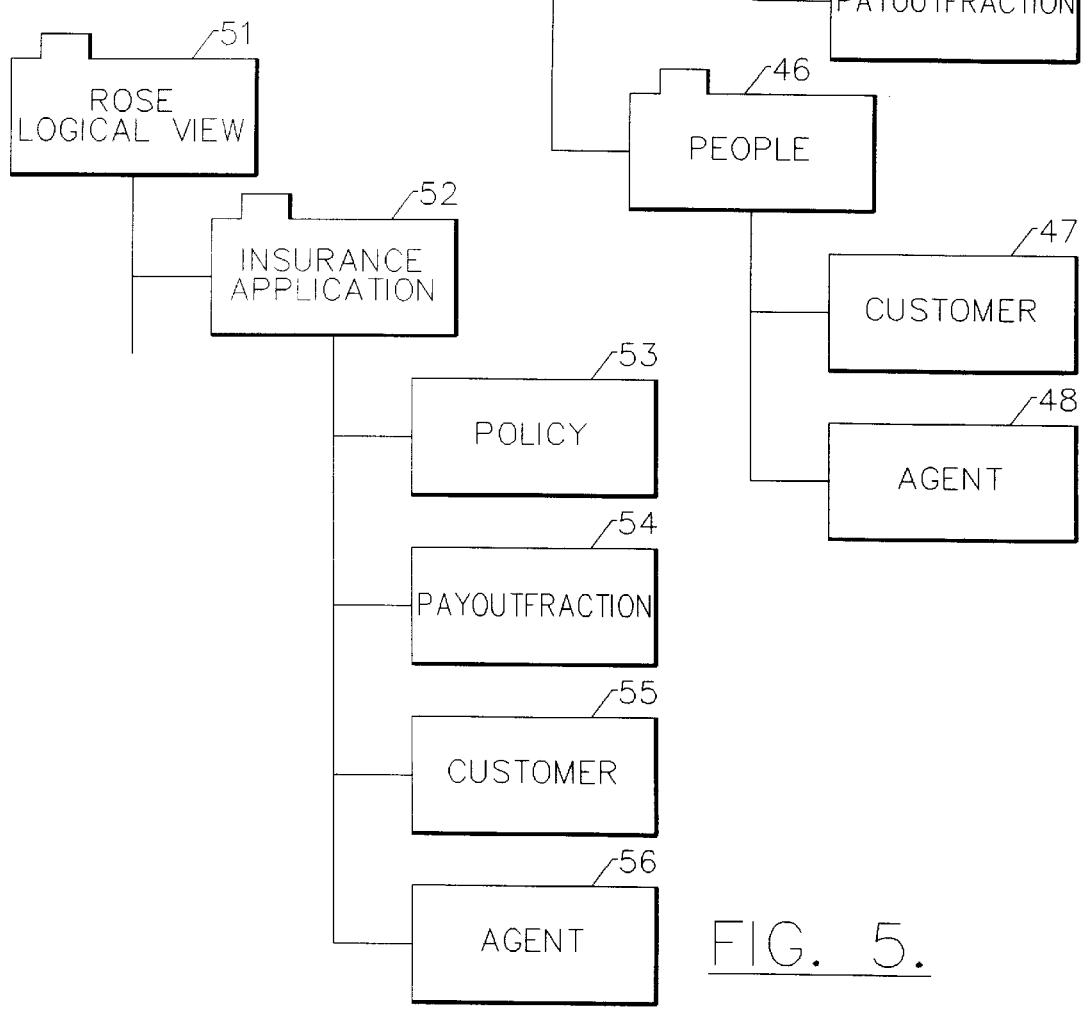
FIG. 5 is a block diagram illustrating an example of name space mapping, and in particular, mapping of each class under the top level package of the design from the analysis environment to interfaces in separate IDL files in the data model according to the present invention.

Referring to FIG. 5, an example of name space mapping for a single package containing four classes will now be described. In this example, the converting system maps each class, namely, "Policy" class 53, "PayoutFraction" class 54, "Customer" class 55 and "Agent" class 56 under the "Insurance Application" package 52 to interfaces contained in separate IDL files in the data model. Specifically, each IDL file in the data model contains an interface. In this example, the converting system provides a "Policy" file containing a "Policy" interface, a "PayoutFraction" file containing a "PayoutFraction" interface, a "Customer" file containing a "Customer" interface, and an "Agent" file containing an "Agent" interface in the data model which correspond to the "Policy," "PayoutFraction," "Customer" and "Agent" classes in the design, respectively.

The mapping convention according to the present invention also maps class specifications. In essence, the object model, and in particular, classes, relationships and inheritances, internal structure of classes, attributes and methods are mapped from the design to the data model. A class specification is mapped to the data model as an interface. A class name in the design is mapped to an interface name in the data model.

In addition, class attributes and operations are also mapped into the data model. If the export control associated with the class attributes and operations in the design is "public," then these attributes and operations are mapped to attributes and methods in the data model. On the other hand, if the export control associated with the operations and attributes in the design is "private," which may also be referred to as "protected," the attributes and operations of the design are mapped to the private data of the interface in the data model corresponding to the class specification. Finally, comments at the class, attribute and operation levels may also be conceptually mapped to their corresponding interface, attribute or operation.

The interface definition language IDL permits IDL types such as "struct," "enum," "typedef," and "exception" to be defined. On the other hand, the Rational Rose visual modeling tool does not enable the use of "types." Rather, the modeling tool only recognizes classes. The converting system according to the present invention permits a developer using modeling tools such as Rational Rose visual modeling tool to define "types." The present invention sets each IDL type in the IDL SpecificationType in the CodeGeneration page in the Class Specification Notebook. The Rational Rose visual modeling tool default setting for IDL SpecificationType is "Interface." As a result of this setting of the IDL type, the developer can designate the class in the design as representing a particular IDL type using the IDL SpecificationType. Thus, the developer can utilize the IDL types with the modeling tool and the converting system will convert these types to their corresponding types in the data model.

For the type "typedef," the ImplementationType property must be set to the type being aliased. Inheritance of the design classes is directly mapped as inheritance of IDL interfaces. In addition, the associations and aggregations in designs using the modeling tool are mapped as interface attributes. This mapping will now be described by way of example. If class A aggregates class B in the design, then the mapped interface A in the data model will contain an attribute of type B which represents the interface mapped from class B. If the aggregation in the design is "many," then the attribute is of type sequence <B>. Navigable associations are mapped in the same manner as aggregations. Finally, the names of the attributes are based on the roles that the classes play in these associations in the design. If no roles are defined, the names are based on the interfaces' names.

The operations of mapping the class specification, including classes, attributes and methods may be illustrated by reference to the pseudocode provided below. In this pseudocode, the reference to "Rose" refers to the Rational Rose visual modeling tool, and the reference to "OB" refers to the data model, and in particular, the Object Builder data model.

Pseudocode for the operations of mapping all the classes for class specification is as follows:
1. For all classes in Rose do
2. Let X be the current Rose class
3. If OB does not contain an interface with same name as X then
4. Create an interface with same name X and map X to it
5. Else, map X to the existing interface in OB
6. End loop Once the classes have been mapped using the above pseudocode, the attributes corresponding to the classes in the design are mapped to the data model using the following pseudocode:
7. For all classes in Rose
8. Let X1 be the current class in Rose
9. Let X2 be the corresponding mapped class in OB
10. For all the attributes of X1 do
11. Let A1 be the current attribute of X1
12. If interface X2 in OB does not contain an attribute with the same name and type as A1, then
13. Create an attribute A2 in X2 (in OB) with the same name and type as A1
14. Else, map A1 to the existing attribute in X2
15. End loop for attributes
16. End loop for classes Once the attributes from the design have been mapped to the data model, the converting system then maps the methods from the design to the data model using the operations set forth in the pseudocode which follows:
17. For all classes in Rose
18. Let X1 be the current class in Rose
19. Let X2 be the corresponding interface in OB
20. For all methods of class X1 in Rose do
21. Let M1 be the current method in X1
22. If X2 does not contain an operation with the same signature as M1 then
23. Create operation M2 in X2 (this includes parameter creation)
24. Else, map M1 to the existing operation in X2
25. End loop for methods
26. End loop for classes As previously indicated, the class may be designated to be of a type which is used in IDL. For example, the class may be designated as being of type "struct," "enum," "union" or "typedef." In the pseudocode provided above, all classes map to interfaces. However, if a class in the design is designated to be one of the IDL types, the pseudocode for conversion of a class in the design which was designated as one of these IDL types, is represented by the same pseudocode listed in steps 1–6 above with the only exception being that the term "interface" is replaced by the corresponding type name, for example, "struct."

The present invention also includes programming model elements, such as a framework from the programming model, in the design as it is being converted to the data model. An element may either be used in a default sense in which case it is not imported into the modeling tool, but rather is loaded into the data model with the design during mapping. On the other hand, a programming model element may be imported into the modeling tool for user modification and definition. Thereafter, the relationships between the imported element, as well as the business classes in the original design and any new business classes added to the design as a result of the imported element, are conceptually mapped to the data model. As a result, the developer can extend the analysis and design results to incorporate elements from the programming model such as keys, business object implementations and copy helpers which the converting system will then convert to a data model.

The elements or concepts from the programming model are implemented in the design according to the present invention as relationships with predefined stereotypes. For example, a relationship stereotype such as "Key" indicates that there is a business object to key relationship between two classes. In this example, a "Policy" class and a "PolicyKey" class might be related by a "Key" relationship. When the converting system encounters such a relationship in the design, the converting system creates a "Policy" interface and a "PolicyKey" interface in the data model and indicates that there is a "Key" relationship between the two interfaces. As a result, the object builder can thereafter add the necessary framework methods for the business object and the key object.

The relationship stereotypes provided by the present invention include a client interface to business object implementation stereotype, business object to data object stereotype, as well as other stereotypes. The client interface to business object implementation is represented by "BOImpl." In this stereotype, if the client interface is "Policy," the business implementation interface is "PolicyBO." As a result, the "PolicyBO" interface inherits from the "Policy" interface and the stereotype of the inheritance relationship is set to "BOImpl." In addition, the "Policy" client interface inherits from the "IManageable" interface. The "IManageable" interface is part of the frameworks from the programming model which are loaded into the modeling tool by the converting system.

A second relationship stereotype which is provided according to the present invention is that of business object to data object. This is best described with respect to an example. If the "Policy" client interface and the "PolicyBO" business implementation interface are related as described above, and "PolicyDO" is the data object for the "Policy" client interface, then the "PolicyBO" business implementation interface and the "PolicyDO" data object are connected by an association relationship. As a result, the relationship stereotype is set to "BO."

Still further, the present invention also provides a business object to key relationship stereotype. For example, if "Policy Key" is the key/identifier interface for the "Policy" class, then the two classes are associated in the modeling tool. The stereotype's relationship for these classes is then set to "Key."

The present invention also enables the copy helper from the programming model to be imported into the design. The converting system will set the relationship stereotype corresponding to a business class in the design and a copy helper class imported from the programming model to the design as "Copy." For example, if the "Policy Copy" class from the programming model which was imported into the design is the copy helper class for the "Policy" class in the design, then the two classes are related by an association, and the stereotype is set to "Copy."

As will be understood by those having skill in the art, other frameworks, concepts and elements in the programming model may be imported into the design using similar stereotypes as described above.

Detailed Description: Incremental Conversion

The converting system according to the present invention provides for incremental transformations or conversions of the design to a data model. Once an initial design created using a modeling tool has been converted, or conceptually mapped, to a data model in the object oriented environment, the developer can add additional classes, relationships, inheritances, attributes, operations and other features to the initial design using the modeling tool to create a new or modified design. The new or modified design may include, in addition to design elements created by the developer, frameworks and other elements imported from the programming model.

Once the new design has been completed, the converting system then bridges or converts the new design to the data model. However, according to the present invention, the converting system converts only the new elements of the new design to the data model. Elements of the original design are not reconverted or bridged to the data model. This is due to the Object Builder which can modify the metadata in the data model after it is loaded into the data model. If the old elements of the original design were reimported into the data model, any modifications made by the Object Builder to the metadata and the data model may be lost.

The incremental conversions provided by the present invention can be illustrated by way of the following example. Classes A, B and C were in the original design. These classes were conceptually mapped to the data model using the converting system. After the conversion of classes A, B and C to the data model, the developer adds class D to the design to create a new design. As a result of the addition of this new class, the converting system converts class D and any new relationships which it may have in corresponding elements into the data model which already contains interfaces A, B and C which correspond to classes A, B and C in the original design. In addition, if the developer adds a new method, such as "myMethod ( )" is added to class A using the modeling tool, then the converting system also converts this new method to interface A in the data model. Original classes A, B and C are not reimported to the data model.

It will be understood by those having skill in the art that once the metadata is complete, and consequently, the data model is complete, the data model may then be used by a code generator to generate code which corresponds to the design. The code then can be executed in an object oriented environment.

While the present invention has been described with respect to a particular modeling tool, namely, the Rational Rose visual modeling tool, which is preferably at least Version 4.0, it will be understood that the present invention is not restricted to the use of any particular modeling tool. In addition, the present invention has also been described with respect to a particular programming model, namely, the BOSS programming model; however, the invention is not restricted to use with any particular programming model.

In the drawings and specification, there have been disclosed typically preferred embodiments of the preferred invention and, although specific terms are employed, they are used in a generic and descriptive sense only and not for purposes of limitation, the scope of the invention being set forth in the following claims.

That which is claimed:

1. A method for generating an object oriented application for an object oriented environment, said object oriented environment comprising a programming model and a data model, said method comprising the steps of:
   generating a computer program design for said object oriented model application using a modeling tool; and
   mapping the modeling tool generated computer program design to the data model of said object oriented environment to thereby create metadata in said data model wherein said mapping step comprises defining a first package, wherein said first package partitions the computer program design into at least two parts without requiring reference to model semantics.

2. The generating method according to claim 1, wherein said computer design mapping step further comprises the step of mapping the first package to at least one of a file and a module in the data model.

3. The generating method according to claim 2, wherein said first package comprises at least one class; and wherein said computer program design mapping step further comprises the step of mapping the at least one class of the first package into an interface in the data model.

4. The generating method according to claim 1, wherein said computer program design mapping step further comprises the steps of:
   defining a second package, wherein said second package is contained in the first package; and
   mapping the second package to at least one of a file and a module in the data model.

5. The generating method according to claim 4, wherein said computer program design mapping step further comprises the step of mapping at least one class of the second package to an interface in the data model.

6. The generating method according to claim 1, wherein said computer program design mapping step comprises the steps of:
   identifying a class specification, said class specification comprising at least one class, relationships between the at least one class and at least a second class, an inheritance associated with the at least one class, at least one attribute associated with the at least one class and at least one method associated with the at least one class, said class specification being identified by a class name; and
   mapping the class specification to an interface in the data model in the object oriented environment.

7. The generating method according to claim 6, wherein said identifying step is preceded by the step of:
   determining an export control associated with the class specification to be one of public or private;
   wherein said class specification mapping step comprises the steps of:
   mapping the class name to an interface name in the data model;
   mapping the attribute to an attribute in the data model and the operation to a method in the data model in response to the means for determining, determining that the export control is public; and
   mapping the attribute and the operation to private data associated with an interface in the data model in response to the means for determining, determining that the export control is private.

8. The generating method according to claim 1, wherein said programming model comprises at least one framework, and wherein said computer program design mapping step is preceded by the step of importing at least one framework from the programming model in the object oriented environment to the computer program design.

9. The generating method according to claim 8, wherein said modeling tool generated computer program design comprises at least one business class, and wherein said importing step is followed by, and said computer program design mapping step is preceded by, the steps of:

determining at least one relationship between the framework of the programming model and the business class; and adding the determined relationship to the modeling tool generated computer program design.

10. The generating method according to claim 8, wherein said computer program mapping step comprises the step of mapping the determined relationship and the business class to the data model without mapping the imported framework to the data model.

11. The generating method according to claim 1, wherein said computer program design mapping step is followed by the steps of:

modifying the computer program design for said object oriented application using said modeling tool to obtain a modeling tool generated computer program design modification; and mapping the modeling tool generated computer program design modification to the data model of said object oriented application.

12. The generating method of claim 1, wherein said computer program design mapping step is followed by the step of generating code based on the metadata.

13. The generating method of claim 12 wherein said generated code can be executed in a distributed computing environment.

14. The generating method according to claim 1, wherein said computer program design mapping step is preceded by the step of:

generating a data model for the object oriented application using an interface definition language.

15. The generating method according to claim 1, wherein said modeling tool comprises Rational Rose visual modeling tool and said data model is defined in Interface Definition Language.

16. A system for generating an object oriented application for an object oriented environment, said object oriented environment comprising a programming model and a data model, said system comprising:

modeling tool means for generating a computer program design for said object oriented model application using a modeling tool; and means for mapping the modeling tool generated computer program design to the data model of said object oriented environment to thereby create metadata in said data model wherein said means for mapping comprises means for defining a first package, wherein said first package partitions the computer program design into at least two parts without requiring reference to model semantics.

17. A computer program product for generating an object oriented application for an object oriented environment, said object oriented environment comprising a programming model and a data model, said computer program product comprising:

a computer readable storage medium having computer readable code means embodied in said medium, said computer readable code means comprising:

computer instruction means for generating a computer program design for said object oriented model application using a modeling tool; and computer instruction means for mapping the modeling tool generated computer program design to the data model of said object oriented environment to thereby create metadata in said data model wherein said computer instruction means for mapping comprises computer instruction means for defining a first package, wherein said first package partitions the computer program design into at least two parts without requiring reference to model semantics.

18. The system for generating according to claim 16, wherein said means for mapping further comprises means for mapping the first package to at least one of a file and a module in the data model.

19. The system for generating according to claim 18, wherein said first package comprises at least one class; and wherein said means for mapping further comprises means for mapping the at least one class of the first package into an interface in the data model.

20. The system for generating according to claim 16, wherein said means for mapping further comprises:

means for defining a second package, wherein said second package is contained in the first package; and means for mapping the second package to at least one of a file and a module in the data model.

21. The system for generating according to claim 20, wherein said means for mapping further comprises means for mapping at least one class of the second package to an interface in the data model.

22. The system for generating according to claim 16, wherein said means for mapping comprises:

means for identifying a class specification, said class specification comprising at least one class, relationships between the at least one class and at least a second class, an inheritance associated with the at least one class, at least one attribute associated with the at least one class and at least one method associated with the at lest one class, said class specification being identified by a class name; and means for mapping the class specification to an interface in the data model in the object oriented environment.

23. The system for generating according to claim 22, further comprising:

means for determining an export control associated with the class specification to be one of public or private;

wherein said means for mapping the class specification comprises:

means for mapping the class name to an interface name in the data model;

means for mapping the attribute to an attribute in the data model and the operation to a method in the data model in response to the means for determining, determining that the export control is public; and means for mapping the attribute and the operation to private data associated with an interface in the data model in response to the means for determining, determining that the export control is private.

24. The system for generating according to claim 16, wherein said programming model comprises at least one framework, the system further comprising:

means for importing at least one framework from the programming model in the object oriented environment to the computer program design.

25. The system for generating according to claim 24, wherein said modeling tool generated computer program design comprises at least one business class, the system further comprising:

means for determining at least one relationship between the framework of the programming model and the business class; and means for adding the determined relationship between the modeling tool generated computer program design.

26. The system for generating according to claim 24, wherein said means for mapping comprises means for mapping the determined relationship and the business class to the data model without mapping the imported framework to the data model.

27. The system for generating according to claim 16, further comprising:

means for modifying the computer program design for said object oriented application using said modeling tool to obtain a modeling tool generated computer program design modification; and means for mapping the modeling tool generated computer program design modification to the data model of said object oriented application.

28. The system for generating according to claim 16, further comprising means for generating code based on the metadata.

29. The system for generating according to claim 28 wherein said generated code can be executed in a distributed computer environment.

30. The system for generating according to claim 16, further comprising means for generating a data model for the object oriented application using an interface definition language.

31. The system for generating according to claim 16, wherein said modeling tool comprises Rational Rose visual modeling tool and said data model is defined in Interface Definition Language.

32. The computer program product for generating according to claim 17, wherein said computer readable program code means for mapping further comprises computer readable program code means for mapping the first package to at least one of a file and a module in the data model.

33. The computer program product for generating according to claim 32, wherein said first package comprises at least one class; and wherein said computer readable program code means for mapping further comprises computer readable program code means for mapping the at least one class of the first package into an interface in the data model.

34. The computer program product for generating according to claim 17, wherein said computer readable program code means for mapping further comprises:

computer readable program code means for defining a second package, wherein said second package is contained in the first package; and computer readable program code means for mapping the second package to at least one of a file and a module in the data model.

35. The computer program product for generating according to claim 34, wherein said computer readable program code means for mapping further comprises computer readable program code means for mapping at least one class of the second package to an interface in the data model.

36. The computer program product for generating according to claim 17, wherein said computer readable program code means for mapping comprises:

computer readable program code means for identifying a class specification, said class specification comprising at least one class, relationships between the at least one class and at least a second class, an inheritance associated with the at least one class, at least one attribute associated with the at least one class and at least one method associated with the at least one class, said class specification being identified by a class name; and computer readable program code means for mapping the class specification to an interface in the data model in the object oriented environment.

37. The computer program product for generating according to claim 36, further comprising:

computer readable program code means for determining an export control associated with the class specification to be one of public or private;

wherein said computer readable program code means for mapping the class specification comprises:

computer readable program code means for mapping the class name to an interface name in the data model;

computer readable program code means for mapping the attribute to an attribute in the data model and the operation to a method in the data model in response to the computer readable program code means for determining, determining that the export control is public; and computer readable program code means for mapping the attribute and the operation to private data associated with an interface in the data model in response to the computer readable program code means for determining, determining that the export control is private.

38. The computer program product for generating according to claim 17, wherein said programming model comprises at least one framework, the system further comprising:

computer readable program code means for importing at least one framework from the programming model in the object oriented environment to the computer program design.

39. The computer program product for generating according to claim 38, wherein said modeling tool generated computer program design comprises at least one business class, the system further comprising:

computer readable program code means for determining at least one relationship between the framework of the programming model and the business class; and computer readable program code means for adding the determined relationship between the modeling tool generated computer program design.

40. The computer program product for generating according to claim 38, wherein said computer readable program code means for mapping comprises computer readable program code means for mapping the determined relationship and the business class to the data model without mapping the imported framework to the data model.

41. The computer program product for generating according to claim 17, further comprising:

computer readable program code means for modifying the computer program design for said object oriented application using said modeling tool to obtain a modeling tool generated computer program design modification; and computer readable program code means for mapping the modeling tool generated computer program design modification to the data model of said object oriented application.

42. The computer program product for generating according to claim 17, further comprising computer readable program code means for generating code based on the metadata.

43. The computer program product for generating according to claim 42 wherein said generated code can be executed in a distributed computer environment.

44. The computer program product for generating according to claim 17, further comprising computer readable program code means for generating a data model for the object oriented application using an interface definition language.

45. The computer program product for generating according to claim 17, wherein said modeling tool comprises Rational Rose visual modeling tool and said data model is defined in Interface Definition Language.

* * * * *

UNITED STATES PATENT AND TRADEMARK OFFICE
CERTIFICATE OF CORRECTION

PATENT NO. : 6,023,578
DATED : February 8, 2000
INVENTOR(S) : Birsan, et al.

It is certified that error appears in the above-identified patent and that said Letters Patent is hereby corrected as shown below:

On the title page,

Under "Other Publications", the Sutherlan reference should read as follows:
-- Sutherlan, Jeff, *Business Object Design and Implementation III*, OOPSLA ACMSIGPLAN, Conf. OO Prog. Syst. Lang. & Appl., pp. 58-62. --

Under "Other Publications", the abstract reference should read as follows:
-- Abstract, *The benefits of building object-oriented applications*, Softw. Econ. Lett., vol. 5, No. 8, Computer Economics, (abstract only) –(NEP) (Aug. 1996).

Signed and Sealed this

Twenty-ninth Day of May, 2001

Attest:

NICHOLAS P. GODICI

*Attesting Officer*     *Acting Director of the United States Patent and Trademark Office*